May 14, 1957  A. E. BECK  2,791,861

FISHHOOK

Filed April 7, 1955

INVENTOR,
ALDEN E. BECK
BY
Charles Shepard
ATTORNEY

United States Patent Office 2,791,861
Patented May 14, 1957

2,791,861

FISHHOOK

Alden E. Beck, Webster, N. Y.

Application April 7, 1955, Serial No. 499,827

2 Claims. (Cl. 43—44.6)

The invention relates to fishhooks which are adapted for use with live bait.

An object of the invention is to provide an improved and more satisfactory fishhook.

Another object is to provide a fishhook which is adapted to hold live bait in a substantially fixed position relative to the fishhook itself, yet permit the live bait to have free swimming movement.

Still another object is the provision of a more effective fishhook which is designed to hold live bait with little or no damage to the bait itself.

A further object is to provide a fishhook on which bait may be positioned to assure a catch whether the fish strikes from the front, rear, or sides of the bait.

A still further object is the provision of a fishhook which is simple in construction and mode of operation, economical to produce, and is adapted for rugged handling and use.

These and other desirable objects may be attained in the manner disclosed as an illustrative embodiment of the invention in the following description and in the accompanying drawings forming a part thereof, in which.

The same reference numerals throughout the several views indicate the same parts.

Figure 1:
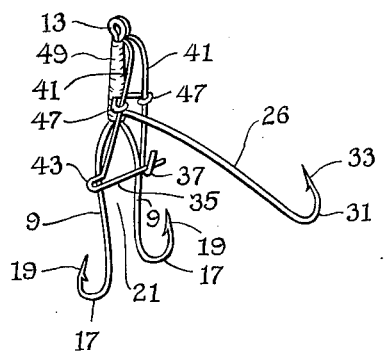
Fig. 1 is a perspective view of the fishhook of the present invention drawn approximately to full scale.

In the preferred embodiment shown in the drawing, the fishhook of the present invention includes a pair of hook members 9 having their shanks 11 disposed in approximately coplanar relationship and secured together as hereafter described. The upper end of each of the shanks 11 is provided with an eye 13, with the eyes 13 of both shanks being alined to form a single opening for the usual leader of the fish line (not shown). At the lower end of the shank 11, the hook members 9 are each provided with an arched portion 15 which gradually merges with the reversely bent lower end 17 having a pointed and barbed extremity 19.

Figure 3:
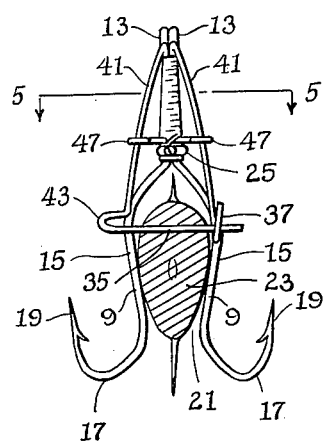
Fig. 3 is a vertical section, on an enlarged scale, taken approximately on the line 3—3 of Fig. 2.
Figure 2:
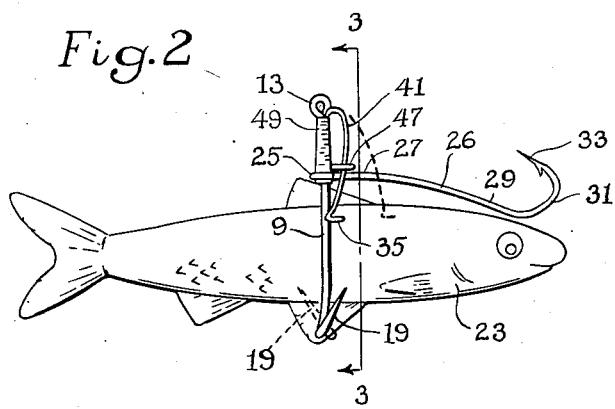
Fig. 2 is a side elevation of the fishhook shown in Fig. 1, in use with a live bait, as for example a minnow.

As best shown in Fig. 3, the arched portions 15 extend in opposite directions relative to each other, with their lower inwardly directed ends being laterally spaced from each other to provide jaw means defining a bait receiving gap having a mouth portion 21 of reduced width. With this construction, the arched portions 15 are adapted to snugly embrace the sides of the live bait, such as the minnow shown at 23, and prevent it from wiggling itself free from the impaling pin hereafter described. To render the fishhook more effective the reversely bent ends 17 are preferably provided with a slight twist so as to have their extremities 19 face in opposite directions longitudinally of the live bait, as shown in Fig. 2.

The shank members 11, at approximately their lower ends, are embraced by the eye 25 of a third hook member 26 having its shank 27 disposed substantially at right angles to the plane of the shanks 11. This shank 27 is gradually arched downwardly at 29 and terminates with an upwardly extending reversely bent portion 31 having a pointed and barbed end 33 which is adapted to extend over a portion of the bait, preferably its head. As with the hook members 9, the reversely bent portion 31 of the hook member 26 is also provided with a slight twist to dispose its pointed and barbed end 33 out of the plane of the remainder of the hook member 26.

The live bait 23 is fixed to the fishhook by an impaling pin 35, the free end of which is adapted to engage with a catch 37. The impaling pin 35 and its catch 37 are each formed of separate pieces of relatively fine spring wire, each of which has a support portion 39 extending vertically alongside the shanks 11 of the hook members 9, and a spring or resilient arm 41. One of the resilient arms 41 carries the catch 37, while the other arm 41 is connected by a reverse bend 43 to the impaling pin 35. The bend 43 acts as a hinge or pivot for the impaling pin 35 and thereby prevents the resilient arm 41, to which it is connected, from being subjected to repeated bendings which may cause it to be ultimately distorted out of position. As best seen in Fig. 3, the resilient arms 41 extend downwardly and outwardly away from each other to permit the minnow 23 to be received on the central portion of the impaling pin 35, between the hinge or pivot bend 43 and the catch 37.

Figure 5:
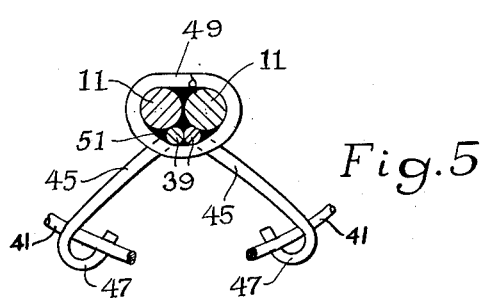
Fig. 5 is a partial horizontal section, on an enlarged scale, taken approximately on the line 5—5 of Fig. 3, showing only the parts near the plane of the section, more remote parts being omitted.

The lower ends of the support portions 39 of the spring wires are bent upwardly at 45 into a plane at right angles to the shanks 11 of the hooks 9, and outwardly away from each other (see Fig. 5) to provide spaced retaining catches 47, each of which is adapted to engage with an intermediate section of an adjacent spring arm 41. The spring arms 41 are normally released from the catches 47 to a position as shown by broken lines in Fig. 2 when it is desired to impale the live bait 23 on the pin 35. However, once the bait has been impaled, each of the spring arms 41 are again engaged with its respective catch 47 to prevent the resilient arms 41 from flexing and to hold the impaling pin 35 in contact with or close to the hook members 9. By means of these catches 47, the impaled minnow 23 or other live bait is allowed little or no freedom in a longitudinal direction, while the arched portions 15 of the hook members 9 snugly embrace the sides of the bait so that the bait is effectively prevented from tearing itself freely from the impaling pin 35 or from wiggling to an extent as to free the impaling pin 35 from the catch 37.

Figure 4:
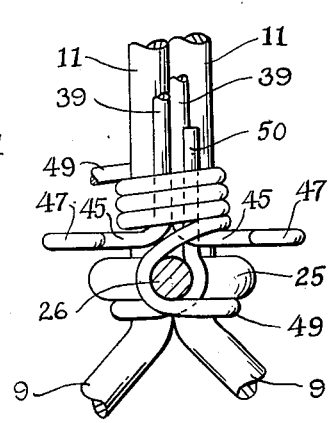
Fig. 4 is a view similar to Fig. 3, on a still further enlarged scale, illustrating a fragmentary portion of the fishhook during an intermediate stage of assembly.

To hold the shanks 11 and the support portions 39 in fixed position as a unit, a relatively fine wire 49 is coiled about these parts, starting at the lower ends of the shanks 11. As seen in Fig. 4, one end 50 of the wire 49 is placed alongside the support portions 39 and extends downwardly so that the first loop of the wire 49 is below the eye 25 of the hook member 26. After this first loop the wire 49 is helically wound around the shanks 11 and support portions 39 between the catches 47 and the eyes 13 at the upper ends of the shanks 11. By providing the first loop of the wire 49 below the eye 25, it is evident, from Fig. 4, that the shank 27 of the hook member 26 is almost completely encircled by the wire 49, thus effectively bracing the hook member 26 against movement from its intended position. To further insure that the fishhook can withstand some rather rough handling, and to hold the various parts against movement relative to each other, solder 51 is flowed over and between the coils of the wire 49.

In baiting the fishhook of the present invention, the resilient arms 41 are first released from the catches 47 and the impaling pin 35 is then freed from its catch 37. In view of the hinge bend 43 and resilience of the spring wire, the impaling pin 35 is adapted to swing away from the catch 37, so that it may be easily inserted transversely through a minnow just below its dorsal fin, where little damage to the minnow results. With the minnow positioned within the slot 21 formed by the arched portions 15 of the hook members 9, the impaling pin 35 is once again engaged with its catch 37, after which the resilient arms 41 are again locked with their catches 47.

From the above description, it will be noted that the fishhook of the present invention is adapted to hold the live bait in a substantially fixed position relative to the fishhook yet permit the live bait to swim freely through the water and attract other larger fish. Further, the method of impaling the live bait causes little damage to the bait itself, and so positions the bait relative to the pointed and barbed ends of the fishhook that any larger fish intending to swallow the bait will be caught by the hook member 26, while the hook members 9 will assure a catch if a strike is made from the sides or rear of the bait. While specific mention has been made to a minnow as live bait, it will of course be understood that other bait, not necessarily live bait, may be employed.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A fishhook including first and second hook members each having a shank, an intermediate arcuate portion, and a pointed and barbed end, connecting means securing said shanks of said first and second hook members alongside of each other with their intermediate arcuate portions extending away from each other, said arcuate portions together forming jaw means defining a bait receiving gap having a mouth portion of reduced width, a third hook member connected to the shanks of said first and second hook members, said third hook member having a shank connected to the shanks of said first and second hook members and a pointed and barbed end adapted to overlie a portion of the bait disposed within said bait receiving gap, a pair of spring arms each having one end connected to the shanks of said first and second hook members, an impaling pin formed on the free end of one of said spring arms and adapted to hold the bait within said bait receiving slot, a catch formed on the free end of the other of said spring arms and adapted to engage with and hold said impaling pin in closed position, and retaining means secured to the shanks of said first and second hook members by said connecting means, said retaining means being adapted to releasably engage with and hold said spring arms against movement away from said first and second hook members whereby said spring arms may be released from said retaining means to permit easier manipulation of said impaling pin when said fishhook is being baited, after which said spring arms may be engaged with said retaining means to prevent the bait from moving relative to the fishhook.

2. A fishhook including a pair of laterally spaced arcuate portions adapted to embracingly engage a bait placed therebetween, a pointed and barbed end formed on one end of each of said arcuate portions, a shank formed on the other end of each of said arcuate portions, a pair of spring arms, an impaling pin formed on one end of one of said spring arms and adapted to hold a bait between said arcuate portions, a catch formed on one end of the other of said spring arms and adapted to hold said impaling pin in closed position, hook members formed on the other end of each of said spring arms, said hook members extending toward and being adapted to releasably engage with an intermediate section of said spring arms, said spring arms each having a portion extending along said shanks, securing means connecting said shanks and said portions of said spring arms as a unit, and a supplementary member secured to said shanks and having a pointed and barbed end adapted to overlie a portion of the bait held between said arcuate portions.

References Cited in the file of this patent

UNITED STATES PATENTS

| 863,272 | Gebhardt | Aug. 13, 1907 |
| 973,119 | Lisch | Oct. 18, 1910 |
| 1,246,150 | Parr | Nov. 13, 1917 |
| 2,051,651 | Pachner et al. | Aug. 18, 1936 |
| 2,193,103 | Kowalski | Mar. 12, 1940 |

FOREIGN PATENTS

| 336,483 | France | Jan. 16, 1904 |
| 820,298 | France | July 26, 1937 |